United States Patent
Lettow et al.

(10) Patent No.: US 9,811,774 B2
(45) Date of Patent: Nov. 7, 2017

(54) RESILIENT RADIO-FREQUENCY TAG

(71) Applicant: VORBECK MATERIALS CORP., Jessup, MD (US)

(72) Inventors: John S Lettow, Washington, DC (US); Sriram Manivannan, Baltimore, MD (US); Dan F Scheffer, Frederick, MD (US); Kenneth E Fritsch, Arnold, MD (US)

(*) Notice: Subject to any disclaimer, the term of this patent is extended or adjusted under 35 U.S.C. 154(b) by 0 days.

(21) Appl. No.: 15/064,215

(22) Filed: Mar. 8, 2016

(65) Prior Publication Data
US 2017/0262748 A1    Sep. 14, 2017

(51) Int. Cl.
*G06K 19/077* (2006.01)

(52) U.S. Cl.
CPC . *G06K 19/07722* (2013.01); *G06K 19/07773* (2013.01)

(58) Field of Classification Search
CPC ........... G06K 19/077; G06K 19/07749; G06K 19/0775; B42D 1/001
USPC ........................................ 235/488, 487, 492
See application file for complete search history.

(56) References Cited

U.S. PATENT DOCUMENTS

| | | | | |
|---|---|---|---|---|
| 7,658,901 B2* | 2/2010 | Prud'Homme | ....... | C01B 31/043 423/415.1 |
| 8,278,757 B2* | 10/2012 | Crain | ....... | C09C 1/46 174/257 |
| 2016/0007893 A1* | 1/2016 | Roberts | ....... | A61B 5/6876 600/309 |
| 2016/0100489 A1* | 4/2016 | Costa | ....... | H01F 27/24 361/764 |
| 2016/0171362 A1* | 6/2016 | Nawrocki | ....... | G06K 19/0723 235/488 |

* cited by examiner

*Primary Examiner* — Daniel St Cyr
(74) *Attorney, Agent, or Firm* — Trentice V. Bolar, Esq.

(57) ABSTRACT

A transponder comprises a first polymer layer. A radio frequency ("RF") transponder is affixed to the first polymer layer, wherein the RF transponder includes a processor in electrical communication with a graphene-based antenna. A second polymer layer is formed on the first polymer layer and the RF transponder. The first polymer layer and second polymer layer form an encasement around the RF transponder. The encasement has a hermeticity of about $10^{-7}$ to about $10^{-12}$ atm·cc/sec. The encasement provides improved impact, temperature, vibration, chemical, and/or corrosion protection to the RF transponder.

20 Claims, 3 Drawing Sheets

RESILIENT RADIO-FREQUENCY TAG

CROSS-REFERENCE TO RELATED APPLICATIONS

This application claims priority to U.S. Provisional Application No. 62/101,355 filed Jan. 8, 2015, which is hereby incorporated herein by reference.

BACKGROUND

The present invention relates generally to radio-frequency identification and specifically to resilient radio-frequency identification tags. Radio-frequency identification ("RFID") is the wireless non-contact use of radio-frequency electromagnetic ("EM") fields to transfer data for the purposes of identifying and/or tracking RFID tags ("tags") that may be attached to objects. The tags can contain integrated circuits having memory for information storage. Tags may be designed to be powered by and read at short and/or long ranges via electromagnetic fields that can be generated by EM induction. Other tags can use a local power source such as a battery. Tags that lack a power source can collect energy from the interrogating EM field, and then act as a passive transponder to emit microwaves or UHF radio waves (i.e., EM radiation at high frequencies).

DETAILED DESCRIPTION

Figure 1:
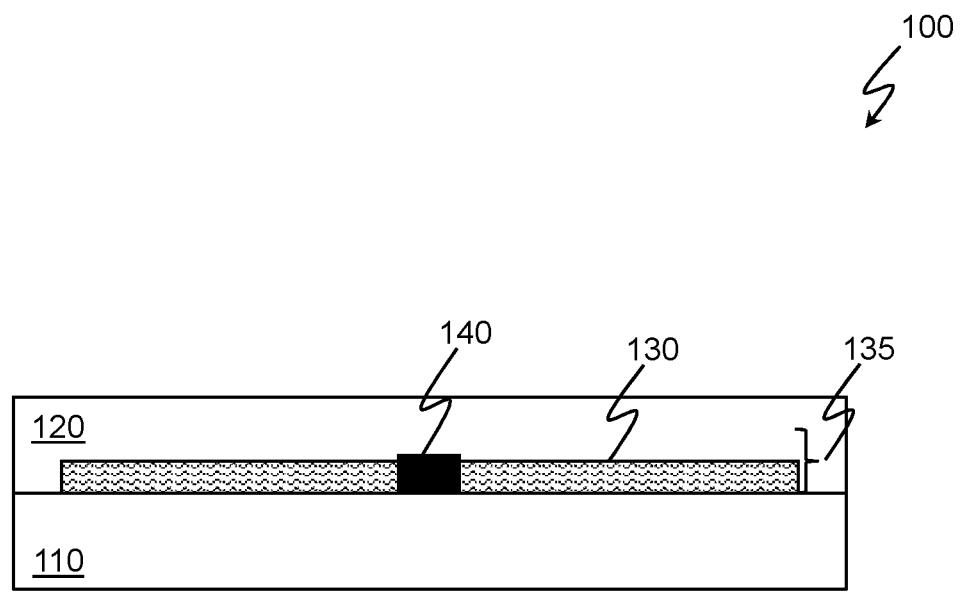
FIG. 1 depicts a cross-view of a tag, generally 100, in accordance with an embodiment of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

Radio-frequency identification ("RFID") is the wireless non-contact use of radio-frequency electromagnetic ("EM") fields to transfer data and may be utilized in an variety of applications, for example, identifying and tracking RFID tags ("tags") that may be attached to objects. The tags can contain electronically stored information. Tags can be designed to be powered by and read at short or long ranges via electromagnetic fields that can be generated by EM induction. Tags may use a local power source such as a battery. Tags lacking a power source may collect energy from the interrogating EM field, and then act as a passive transponder to emit microwaves or UHF radio waves (i.e., EM radiation at high frequencies).

Tag are typically deployed in environments having standard ambient temperature and pressure (SATP) conditions or similar conditions. SATP refers to a temperature of 25° C. (77° F.) and an absolute pressure of 100.0 kPa (14.504 psi, 0.987 atm). Tag structural fortification may be desired to expand the applicable operational environments beyond SATP environments (non-traditional environments). Failure mechanisms which are typically active in tags may be either initiated or accelerated by the presence of moisture. Leaks arising from poor seals can allow moisture to enter the tag freely and contact the antenna.

Embodiments of the present invention seek to provide fortified tags that are operational in non-traditional environments. Non-traditional environments can also include operational environments that exhibit high temperatures (those above 25° C.), high pressures (those above 100.0 kPa), exposure to multiple impacts, exposure to vibrations, saline exposure, humidity, and/or water emersion. Other aspects of the present invention seek to provide fortified tags having an encasement that provides a hermeticity of at least about $10^{-7}$ to about $10^{-12}$ atm·cc/sec, which means a leak rate that is slightly higher than about a 1 cc leak every 3 years. Note, applicable hermeticity levels can comprise any value or sub-range of values included in the aforementioned range. The size of a leak may be measured by the volume of fluid which can pass through the leak each second with a pressure difference of 1 atmosphere. Additional aspects of the present invention seek to provide fortified tags that include a graphene-based antennas. Other embodiments of the present invention seek to provide tags that are comprised of flexible and/or rigid polymers. An embodiment of the present invention seek to provide graphene-based antennas that comprise graphene sheets having a surface area of at least 100 m$^2$/g. The graphene sheets can comprise individual sheets of graphene. The individual sheets of graphene can have a carbon-to-oxygen ratio of at least about 100:1. The individual graphene sheets can form a three-dimensional interconnected network within the composition. Certain embodiments of the present invention seek to provide fortified tags that comprise thermochromic material, a phosphorescent material, glass beads, Teflon, and/or an iridescence material.

FIG. 1 depicts a cross-section of a tag, generally 100, in accordance with an embodiment of the present invention. Tag 100 is a fortified tag that can operate in non-traditional environments (discussed above). Tag 100 can be an active or passive RFID tag. Tag 100 includes chip 140 and antenna 130 (together termed components 135) affixed to the top surface of layer 110. Antenna 130 can be formed directly on the surface of layer 110. Antenna 130 can be formed on the surface of a substrate and subsequently affixed to layer 110. Applicable substrates include, but are not limited to flexible and/or stretchable materials, silicones and other elastomers and other polymeric materials. Applicable substrates may comprise metals, which include, but are not limited to, aluminum, copper, steel, stainless steel, gold, and silver. Applicable substrates may comprise adhesives.

Applicable substrates may comprise heat-sealable materials, which includes, but is not limited to, cellulose, biaxially oriented polypropylene, poly(lactic acid), and polyurethanes. Applicable substrates may comprise fabrics. As used herein, the term fabric is used to refer to any material made through weaving, knitting, spreading, crocheting, or bonding. Applicable substrates may comprise textiles, which includes cotton, wool, flax polyesters, and rayon. As used herein, the term textile is used to refer to material is comprised of interlacing fibers. Applicable substrates may comprise cloth. As used herein, the term cloth is used to refer to a finished piece of fabric used for a specific purpose. Applicable substrates may comprise glasses, minerals, ceramics, silicon surfaces, wood, paper, cardboard, paperboard, cellulose-based materials, glassine, labels, silicon, semiconductors, laminates, corrugated materials, concrete, bricks, building material.

Applicable substrates may be in the form of films, papers, wafers, and/or three-dimensional objects. Applicable substrates may be treated with coatings or similar materials prior to antenna 130 and/or chip 140 being affix to the substrate. Chip 140 can be applied to the substrate using a conductive epoxy. Applicable coatings include, but is not limited to, indium tin oxide, antimony tin oxide, and polymeric coatings. Applicable polymeric coatings include, but are not limited to, PET, polyethylene, polypropylene, acetates, and nitrocellulose. Applicable substrates may be in a woven, non-woven, and/or mesh form. Applicable substrates may comprise paper-based materials, including, but not limited to, paper, paperboard, cardboard, and glassine. Applicable paper-based materials may be sized.

Chip 140 can be passive or active. Chip 140 can comprise memory and/or a processor. Antenna 130 comprises conductive material.

Antenna 140 may contain metals, which include, but are not limited to, steel, silver, aluminum, gold, and tin. Antenna 140 may comprise a graphene-based composition ("the composition"). The composition, graphene sheets, substrates and/or antenna formation methods can be derived and/or accomplished in a variety of manners, including but not limited to, those disclosed in, for example, U.S. Pat. No. 7,658,901 B2 by Prud'Homme et al, United States patent application 2011/0189452 A1 by Lettow et al., McAllister et al. (*Chem. Mater.* 2007, 19, 4396-4404), United States patent application 2014/0050903 A1 by Lettow et al., and U.S. Pat. No. 8,278,757 B2 by Crain et al, United States patent application 2012/0097903 A1 by Scheffer, United States patent application 2012/0142832 A1 by Varma et al., PCT application no. PCT/US2012/065135 by Redmond et al., PCT application no. PCT/US2012/065131 by Redmond et al., PCT application no. PCT/US2012/065130 by Redmond et al., which are hereby incorporated by reference in their entirety ("the references"). Antenna 140 can be formed in a manner to operate within a variety of including, but not limited to, HF, VHF, UHF, L, S, C, X, Ku, K, Ka, V, W, mm, A, B, C, D E, F, G H, I, J, K, L, and M frequencies. Chip 140 can be active or passive. Layer 110 includes a polymer (discussed below). Layer 110 may be pre-applied to a mold to obtain a predetermined depth and cured (discussed further below) prior to the application of the below mentioned components thereon.

Tag 100 also includes layer 120, which is formed on the surface of layer 110 in a manner to completely encase components 135 between layers 110 and 120. Layer 120 includes a polymer (discussed below). Molten layer 120 can be applied to layer 110 to generate the encasement. Layer 120 can be formed on layer 110 in a manner that covers at least a portion of a surface of layer 110. In certain embodiments, the thickness of layer 120 is less than that of layer 135. For example, the encasement provides increased shock resistance, wherein tag 100 can be dropped from 2.0 meters on to asphalt 100 times and not suffer from a statistical difference (>0.02%) in functionality (i.e. read range, transmission).

Figure 2:
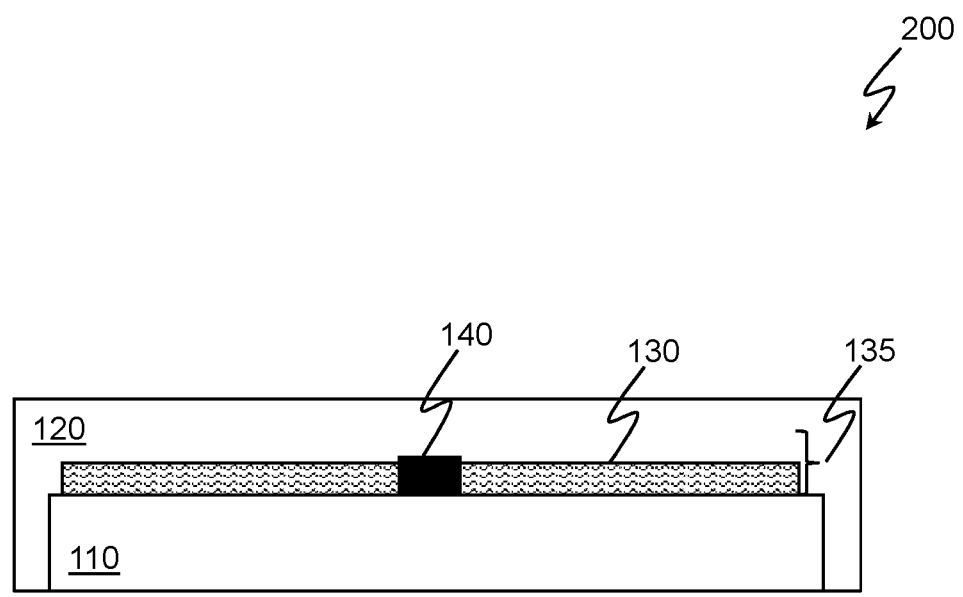
FIG. 2 depicts a cross-view of a tag, generally 200, in accordance with an embodiment of the present invention.

Layer 120 can be formed in a manner to cover at least a portion of two or more surfaces of layer 110, as depicted in FIG. 2. Such embodiments can reduce the hermeticity of the tag and thereby reduce the presence of moisture and/or contaminants on and/or near components 135.

Layers 110 and/or 120 may comprise one or more polymers. Applicable polymers can include those disclosed in the references (discussed above). Applicable polymers can include, but are not limited to, polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral) (PVB), poly(vinyl formal), poly(methyl methacrylate) and other acrylate polymers and copolymers (such as methyl methacrylate polymers, methacrylate copolymers, polymers derived from one or more acrylates, methacrylates, ethyl acrylates, ethyl methacrylates, butyl acrylates, butyl methacrylates, glycidyl acrylates and methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), poly(vinyl acetate) and poly(vinyl acetate) copolymers, poly(vinyl pyrrolidone) and poly(vinyl pyrrolidone) copolymers, vinyl acetate and vinyl pyrrolidone copolymers, polycarbonates (PC), polyamides, polyesters, liquid crystalline polymers (LCPs), poly(lactic acid) (PLA), poly(phenylene oxide) (PPO), PPO-polyamide alloys, polysulphone (PSU), polysulfides, polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), poly(vinyl chloride) (PVC), polyurethanes (thermoplastic and thermosetting (including cross-linked polyurethanes such as those cross-linked amines, etc.), aramides (such as Kevlar® and Nomex®), polysulfides, polytetrafluoroethylene (PTFE), polysiloxanes (including polydimethylenesiloxane, dimethylsiloxane/vinylmethylsiloxane copolymers, vinyldimethylsiloxane terminated poly(dimethylsiloxane), etc.), elastomers, epoxy polymers (including cross-linked epoxy polymers such as those cross-linked with polysulfones, amines, etc.), polyureas, alkyds, cellulosic polymers (such as nitrocellulose, ethyl cellulose, ethyl hydroxyethyl cellulose, carboxymethyl cellulose, cellulose acetate, cellulose acetate propionates, and cellulose acetate butyrates), polyethers (such as poly(ethylene oxide), poly(propylene oxide), poly(propylene glycol), oxide/propylene oxide copolymers, etc.), acrylic latex polymers, polyester acrylate oligomers and polymers, polyester diol diacrylate polymers, and UV-curable resins.

Examples of elastomers include, but are not limited to, polyurethanes, copolyetheresters, rubbers (including butyl rubbers and natural rubbers), styrene/butadiene copolymers, styrene/ethylene/butadiene/styrene copolymer (SEBS), polyisoprene, ethylene/propylene copolymers (EPR), ethylene/propylene/diene monomer copolymers (EPDM), polysiloxanes, and polyethers (such as poly(ethylene oxide), poly(propylene oxide), and their copolymers).

Examples of polyamides include, but are not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylylene adipamide) (polyamide MXD,6)) and polyterephthalamides such as poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene terephthalamide and hexamethylene adipamide, the polyamide of hexamethyleneterephthalamide, and 2-methylpentamethyleneterephthalamide), etc. The polyamides may be polymers and copolymers (i.e., polyamides having at least two different repeat units) having melting points between about 120 and 255° C. including aliphatic copolyamides having a melting point of about 230° C. or less, aliphatic copolyamides having a melting point of about 210° C. or less, aliphatic copolyamides having a melting point of about 200° C. or less, aliphatic copolyamides having a melting point of about 180° C. or less, etc. Examples of these include those sold under the trade names Macromelt by Henkel and Versamid by Cognis.

Applicable acrylate polymers can include those made by the polymerization of one or more acrylic acids (including acrylic acid, methacrylic acid, etc.) and their derivatives, such as esters. Applicable acrylate polymers can include methyl acrylate polymers, methyl methacrylate polymers, and methacrylate copolymers. Applicable acrylate polymers can include polymers derived from one or more acrylates, methacrylates, acrylic acid, methacrylic acid, methyl acrylate, methyl methacrylate, ethyl acrylate, ethyl methacrylate, butyl acrylate, butyl methacrylate, glycidyl acrylate, glycidyl methacrylates, 2-ethylhexyl acrylate, 2-ethylhexyl methacrylate, hydroxyethyl acrylate, hydroxyethyl (meth) acrylate, acrylonitrile, and the like. The polymers may comprise repeat units derived from other monomers such as olefins (e.g. ethylene, propylene), vinyl acetates, vinyl alcohols, and vinyl pyrrolidones. Applicable acrylate polymers may include partially neutralized acrylate polymers and copolymers (such as ionomer resins).

Examples of polymers include Elvacite® polymers supplied by Lucite International, Inc., including Elvacite® 2009, 2010, 2013, 2014, 2016, 2028, 2042, 2045, 2046, 2550, 2552, 2614, 2669, 2697, 2776, 2823, 2895, 2927, 3001, 3003, 3004, 4018, 4021, 4026, 4028, 4044, 4059, 4400, 4075, 4060, and 4102. Other polymer families include Bynel® polymers (such as Bynel® 2022 supplied by DuPont) and Joncryl® polymers (such as Joncryl® 678 and 682). Examples of polyesters include, but are not limited to, poly(butylene terephthalate) (PBT), poly(ethylene terephthalate) (PET), poly(1,3-propylene terephthalate) (PPT), poly(ethylene naphthalate) (PEN), and poly(cyclohexanedimethanol terephthalate) (PCT).

Subsequent to curing, layer 110 can be transferred to an additional mold having another shape. The overall shape of layers 110 and 120 can be similar, dissimilar, and/or complementary to each other. Layer 110 can be cured prior to the application of components 135 to a surface thereof. Layer 120 can be cured subsequent to the formation of layer 120 on to components 135 and the surface of layer 110. Layers 110 and 120 may be cured using any suitable technique, which includes, but is not limited to, drying and oven drying (in air or another inert gas or suitable techniques, UV curing, IR curing drying, crosslinking, thermal curing, layer cursing, microwave curing or drying, and sintering.

Figure 3:
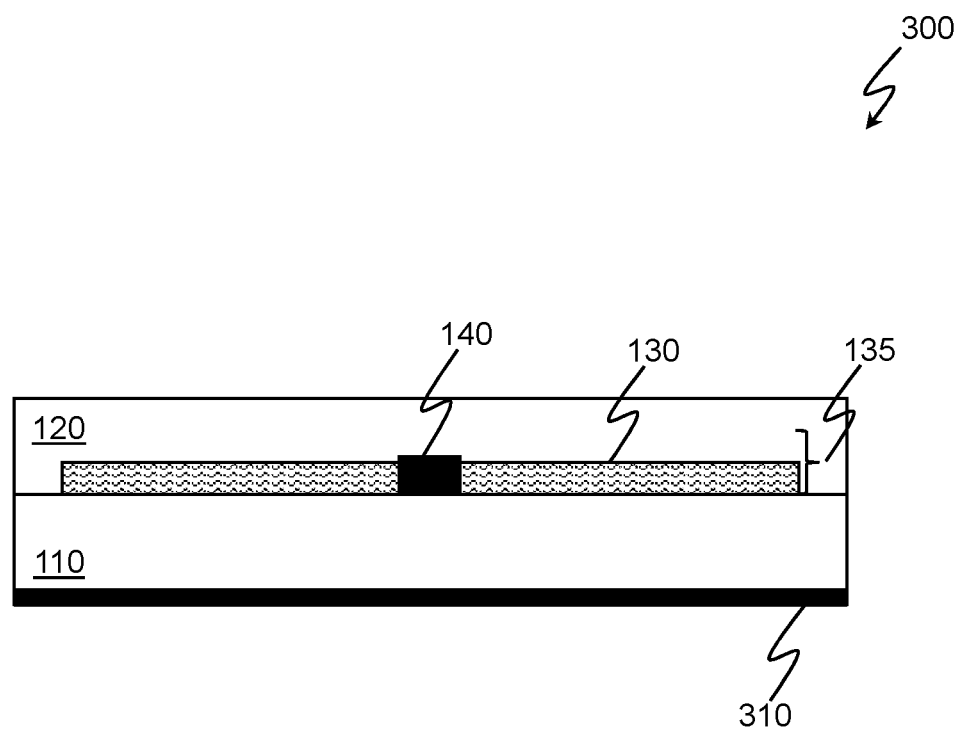
FIG. 3 depicts a cross-view of a tag, generally 300, in accordance with an embodiment of the present invention.

FIG. 3 depicts a cross-view of a tag, generally 300, in accordance with an embodiment of the present invention. Tag 300 comprises tag 100 with layer 310 formed on the bottom surface of layer 110. Tag 300 can have a thickness of up to 200 µm. Tag 300 can be formed in a manner to maintain its functional and mechanical characteristics in an environment that is up to about 400° C. Applicable environmental temperatures comprise about −35° C. to about 0° C., about 0° C. to about 50° C., about 50° C. to about 100° C., about 100° C. to about 150° C., about 150° C. to about 200° C., about 200° C. to about 250° C., about 250° C. to about 300° C., about 300° C. to about 350° C., and/or about 350° C. to about 400° C. Layer 310 can comprise magnetic material. Layer 310 can comprise an adhesive. Layer 310 can allow be applied to a surface of tag 200. Magnetic material should be insulated to reduce or eliminate interference with the transponder antenna.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

What is claimed is:
1. A transponder comprising:
   a first polymer layer;
   a radio frequency ("RF") transponder affixed to the first polymer layer, wherein the RF transponder includes a processor in electrical communication with a graphene-based antenna;

a second polymer layer formed on the first polymer layer and the RF transponder;

wherein the first polymer layer and second polymer layer form an encasement around the RF transponder;

wherein the encasement has a hermeticity of about $10^{-7}$ to about $10^{-12}$ atm·cc/sec; and wherein the encasement provides improved impact, temperature, vibration, chemical, and/or corrosion protection to the RF transponder.

2. The transponder of claim 1, further comprising an adhesive polymer layer in communication with the first polymer layer or second polymer layer.

3. The transponder of claim 1, further comprising a magnetic material in communication with a first side of an insulating material, wherein a second side of the insulating material is in communication with the first polymer layer or the second polymer layer.

4. The transponder of claim 1, wherein the transponder maintains its functional characteristics at 300° C. to 400° C.

5. The transponder of claim 1, wherein the graphene-based antenna comprises a composition that includes graphene sheets having a surface area of at least 100 $m^2$/g.

6. The transponder of claim 1, wherein the graphene-based antenna comprises a composition that includes graphene sheets having a carbon-to-oxygen ratio of at least about 100:1.

7. The transponder of claim 1, wherein the first polymer layer and/or the second polymer layer comprises a thermochromic material, a phosphorescent material, glass beads, Teflon, and/or an iridescence material.

8. The transponder of claim 1, wherein the graphene-based antenna comprises printed composition that includes individual graphene sheets.

9. The transponder of claim 1, wherein the graphene-based antenna comprises a composition that includes individual sheets of graphene, and wherein the individual sheets of graphene form a three-dimensional interconnected network.

10. The transponder of claim 1, wherein the transponder is formed in a manner to maintain functionality after 100 2.0 meter drops on to asphalt.

11. A method comprising:

forming a first polymer layer;

affixing a RF transponder to a surface of the first polymer layer, wherein the RF transponder includes a processor in electrical communication with a graphene-based antenna;

forming a second polymer layer on the surface of the first polymer layer in a manner to completely encase the RF transponder between the first polymer layer and the second polymer layer;

wherein the RF transponder is encased with a hermeticity of about $10^{-7}$ to about $10^{-12}$ atm·cc/sec; and wherein the first polymer layer and/or the second polymer layer provides impact, temperature, vibration, chemical, and/or corrosion protection to the RF transponder.

12. The method of claim 11, further comprising forming an adhesive layer on to the first polymer layer or second polymer layer.

13. The method claim 11, further comprising forming a magnetic material on a first side of an insulating material, and affixing a second side of the insulating material to the first polymer layer or second polymer layer.

14. The method claim 11, transponder maintains its functional characteristics at 300° C. to 400° C.

15. The method of claim 11, wherein the graphene-based antenna comprises a composition that includes graphene sheets having a surface area of at least 100 $m^2$/g.

16. The method of claim 11, wherein the graphene-based antenna comprises a composition that includes graphene sheets having a carbon-to-oxygen ratio of at least about 100:1.

17. The method of claim 11, wherein the first polymer layer and/or the second polymer layer includes a thermochromic material, a phosphorescent material, glass beads, Teflon, and/or an iridescence material.

18. The method of claim 11, wherein the graphene-based antenna comprises printed composition that includes individual graphene sheets.

19. The method of claim 11, wherein the graphene-based antenna comprises a composition that includes individual sheets of graphene, and wherein the individual sheets of graphene form a three-dimensional interconnected network.

20. The method of claim 11, wherein the transponder is formed in a manner to maintain functionality after 100 2.0 meter drops on to asphalt.

* * * * *